Sept. 28, 1926.                L. BONELL                1,601,671
                                PERCOLATOR
                             Filed May 22, 1925
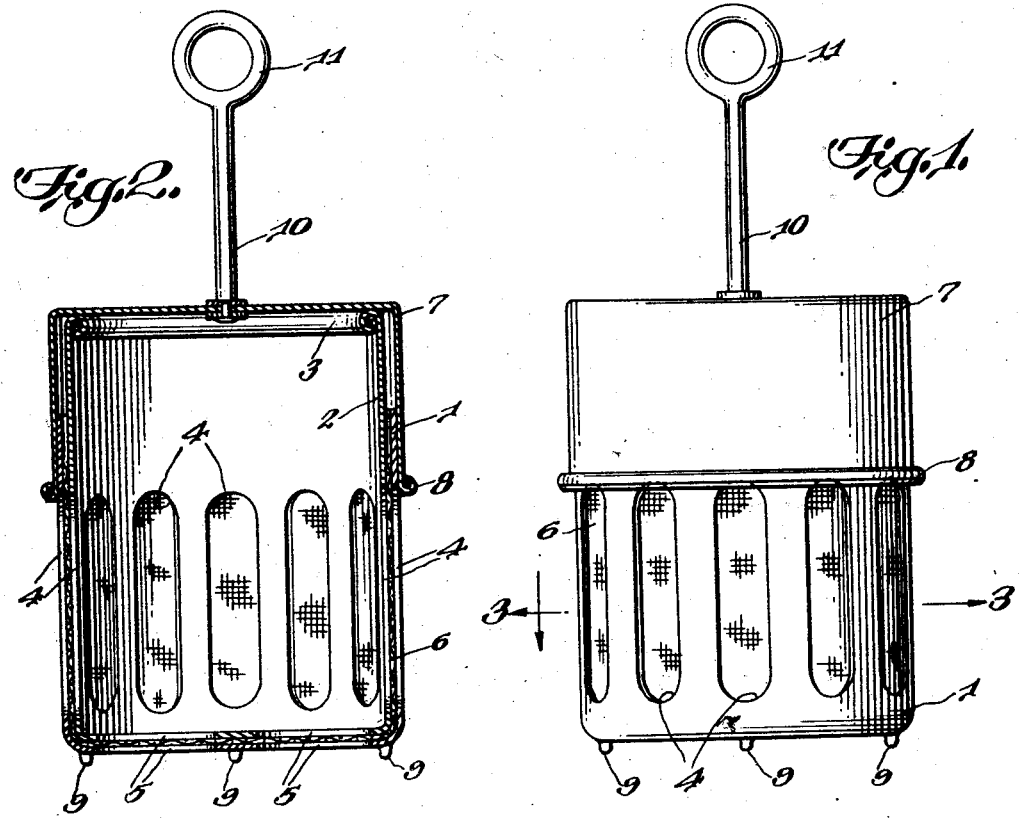
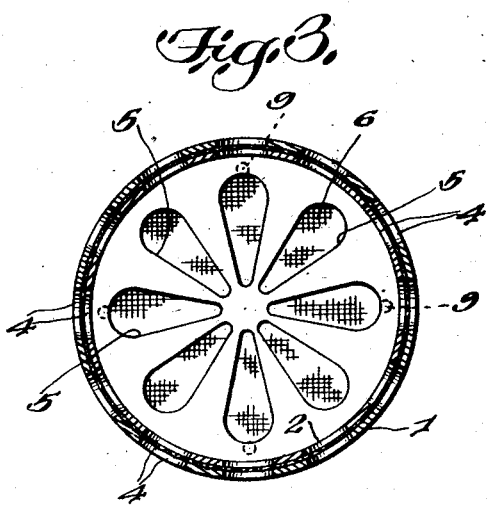
Lawrence Bonell
INVENTOR
BY Victor J. Evans
ATTORNEY Patented Sept. 28, 1926.

1,601,671

UNITED STATES PATENT OFFICE.

LAWRENCE BONELL, OF CHICAGO, ILLINOIS.

PERCOLATOR.

Application filed May 22, 1925. Serial No. 32,148.

This invention relates to new and useful improvements in percolators and more particularly to a device of this character which is particularly adapted for use for receiving ground coffee or other material preparatory to the forming of a brew. The main object of my invention is the provision of a percolator of the above type which will positively prevent any grounds or solid material from entering the liquid with the container so as to produce a clear extract wherein the solid particles will be eliminated and the usual sediment contained in the liquid be reduced to a minimum.

Another object of my invention is the provision of a percolator which is not only adapted for use in percolating coffee, but may be used equally as well for brewing herbs for medicinal compounds and for various other purposes along this line.

A still further object of my invention is the provision of a percolator wherein the parts are so assembled as to permit them to be readily disassembled so that the device may be thoroughly cleansed and retained in a sanitary condition.

A still further object of my invention is the provision of a percolator of the above character so constructed that it may be used with various types of vessels adapted for use in boiling purposes and wherein the material to be steeped can be placed in the receptacle and the receptacle and contents immersed in the boiling water and readily removed without trouble when so desired.

With the above and other objects in view, my invention consists in the novel features of construction and the combination and arrangement of parts to be hereinafter more fully described, pointed out in the claims and shown in the accompanying drawings, in which:

Fig. 1 is a side elevation of a percolator constructed in accordance with my invention, Fig. 2 is a sectional vertical view, and Fig. 3 is a horizontal section view taken on the line 3—3 of Fig. 1.

In carrying out my invention I provide two interfitting receptacles 1 and 2, the receptacle 2 being of a size to loosely fit within the receptacle 1 so that the outer wall thereof will be spaced from the inner wall of the inner receptacle and the receptacle 2 is formed somewhat longer than the receptacle 1 as shown in Fig. 2 and its upper edge rolled inwardly as shown at 3 to provide a reinforcing rib at the top of the receptacle having a smooth exterior and provide means whereby the receptacle 2 may be readily removed from the receptacle 1.

Both of the receptacles—1 and 2— have formed in their outer walls the spaced openings 4, the openings in one receptacle being arranged in direct alignment with the openings in the other receptacle and both receptacles are further provided with a pareshaped opening 5 in their bottom ends which are disposed in direct alignment with each other and arranged radially relative to the inner center of the bottom.

When it is desired to percolate coffee, herbs and the like, closely woven straining means is provided which in the present instance is indicated at 6, and comprises a closely woven fabric adapted to be fitted into the interior of the receptacle 1 and the receptacle 2 fitted within the straining cloth 6 so that the cloth will be tightly positioned between the walls of the two receptacles and will cover the openings 4 and 5 whereby to prevent any of the solid particles within the receptacles from passing through the openings 4 and 5.

It will be apparent from the foregoing that the coffee or similar material placed within the receptacles and the entire device placed in a receptacle containing water to be boiled in order to remove the extract from the contents of the receptacle, a closely woven material 6 permitting the thorough circulation of the fluid through the receptacles in order to bring the same into contact with the material therein.

A cover member 7 is provided for the device, said cover fitting over the upper end of the outer receptacle, with its closed end resting upon the rolled edge of the inner receptacle 2, as shown in Fig. 2. The lower edge of the cover 7 is rolled outwardly as shown at 8 in order to provide a tapered engaging surface so that when the cover is fitted over the upper end of the receptacle 1 it may be readily passed over the upper edge of the same and fitted into the same as shown in the drawings.

It is essential that the device when placed in a larger receptacle be supported above the surface of the receptacle in which it is placed and in order to carry this out the lugs 9 are formed upon the bottom of the outer receptacle 1 and rested upon the bottom of the receptacle into which the device is placed so as to permit the fluid to circulate through the bottom openings 5. The cover 7 fits tightly over the upper end of the receptacle 1 so that the device may be raised and lowered in a boiling receptacle and in order to facilitate the raising and lowering of the device the stem 10 is attached to the central portion of the cover 7 and has a finger piece 11 in its outer end.

It will be apparent from the foregoing that I have provided a simple and inexpensive device formed of separable sections with a closely woven straining member interposed between said sections and the sections so arranged that they may be quickly and readily separated for cleansing and should the straining cloth 6 become worn or torn it may be quickly and readily replaced with a new one.

While I have shown and described the preferred form of my invention, it will be obvious that various changes in the details of construction and in the proportions without sacrificing any of the novel features or departing from the scope of the appended claims.

Having thus described my invention, I claim:

1. A device of the class described comprising a casing adapted to be inserted in and enclosed by a container, said casing being defined by two sections telescopically arranged with respect to each other with the bottom of one of the sections disposed upon the bottom of the other of the sections, said sections defining openings in their side and bottom walls, and a reticulated member confined between the sections and extending over the openings.

2. A device of the class described comprising a casing adapted to be inserted in and enclosed by a container, said casing being defined by two sections telescopically arranged with respect to each other with the bottom of one of the sections disposed upon the bottom of the other of the sections, said sections defining openings in their side and bottom walls, a reticulated member confined between the sections and extending over the openings, and means for removing said device from said container, said means including a cover adapted to fit over the upper end portion of said other of the sections, and a handle carried by the cover member and extending upwardly therefrom.

3. A device of the class described comprising a casing adapted to be inserted in and enclosed by a container, said casing being defined by an inner and an outer section, said sections being telescopically arranged with respect to each other with the bottom of the inner section disposed upon the bottom of the outer section, said sections defining elongated openings in their side walls, a reticulated member confined between the sections and extending across the openings, and means for removing said device from said container, said means including a cover adapted to frictionally fit over the upper end portion of the outer section, and a handle carried by the cover member and extending upwardly therefrom.

In testimony whereof I affix my signature.

LAWRENCE BONELL.